United States Patent
Chiang et al.

(10) Patent No.: US 8,612,877 B2
(45) Date of Patent: Dec. 17, 2013

(54) METHOD FOR PROVIDING OPTIONS ASSOCIATED WITH COMPUTER APPLICATIONS IN A MOBILE DEVICE AND A MENU AND APPLICATION THEREFOR

(75) Inventors: Hui Yu Chiang, Burnaby (CA); Alen Mujkic, Mississauga (CA); Sherryl Lee Lorraine Scott, Toronto (CA)

(73) Assignee: BlackBerry Limited, Waterloo (CA)

( * ) Notice: Subject to any disclaimer, the term of this patent is extended or adjusted under 35 U.S.C. 154(b) by 1024 days.

(21) Appl. No.: 11/611,969

(22) Filed: Dec. 18, 2006

(65) Prior Publication Data

US 2008/0148182 A1 Jun. 19, 2008

(51) Int. Cl.
*G06F 3/048* (2013.01)
*G06F 3/00* (2006.01)

(52) U.S. Cl.
USPC ............ 715/769; 715/764; 715/770; 715/808

(58) Field of Classification Search
USPC .......... 715/810, 764, 796, 770, 808; 707/795, 707/828
See application file for complete search history.

(56) References Cited

U.S. PATENT DOCUMENTS

| | | | | | |
|---|---|---|---|---|---|
| 5,261,042 | A | * | 11/1993 | Brandt | 715/841 |
| 5,485,175 | A | * | 1/1996 | Suzuki | 715/841 |
| 5,694,563 | A | * | 12/1997 | Belfiore et al. | 715/821 |
| 5,714,971 | A | * | 2/1998 | Shalit et al. | 715/804 |
| 6,011,555 | A | * | 1/2000 | Eckhoff et al. | 715/843 |
| 6,023,267 | A | * | 2/2000 | Chapuis et al. | 715/810 |
| 6,411,311 | B1 | | 6/2002 | Rich et al. | |
| 6,546,393 | B1 | * | 4/2003 | Khan | 1/1 |
| 6,765,597 | B2 | * | 7/2004 | Barksdale et al. | 715/853 |
| 6,990,638 | B2 | * | 1/2006 | Barksdale et al. | 715/853 |
| 7,218,926 | B2 | * | 5/2007 | Bocking et al. | 455/419 |
| 7,418,670 | B2 | * | 8/2008 | Goldsmith | 715/810 |
| 7,549,126 | B2 | * | 6/2009 | Conrad et al. | 715/769 |
| 2002/0059288 | A1 | * | 5/2002 | Yagi et al. | 707/102 |
| 2002/0163544 | A1 | * | 11/2002 | Baker et al. | 345/835 |
| 2003/0052926 | A1 | * | 3/2003 | Dunlap et al. | 345/841 |
| 2003/0227438 | A1 | * | 12/2003 | Campbell et al. | 345/156 |
| 2004/0268265 | A1 | | 12/2004 | Berger | |
| 2005/0119031 | A1 | | 6/2005 | Spalink et al. | |
| 2005/0181878 | A1 | | 8/2005 | Danieli et al. | |

(Continued)

FOREIGN PATENT DOCUMENTS

EP 1434412 6/2004

OTHER PUBLICATIONS

Dave Mabe, BlackBerry Hacks, Pub Date: Oct. 13, 2005, O'Reilly Media, Inc., Print ISBN-13: 978-0-596-10115-2; Chapter 1, Section 6.*

*Primary Examiner* — Steven B Theriault
(74) *Attorney, Agent, or Firm* — Brett J. Slaney; Blake, Cassels & Graydon LLP

(57) ABSTRACT

A menu and application utilizing the menu is provided that provides a sub-list of outcomes associated with a list of options directly in the menu to avoid multiple sub-menus and/or navigation through multiple screens. The menu is particularly beneficial with mobile devices where screen area is at a premium and navigation through multiple screens can be confusing. The outcomes may be folders in which an application stored on the mobile device can be moved, and/or a list of applications that can be unhidden. When moving an application into a folder, a moving mode feature is preferably initiated that enables the user to move the application within the selected folder without having to choose such an option.

19 Claims, 7 Drawing Sheets

(56) References Cited

U.S. PATENT DOCUMENTS

| | | |
|---|---|---|
| 2005/0198153 A1* | 9/2005 | Keohane et al. ............. 709/206 |
| 2006/0069690 A1* | 3/2006 | Patel et al. .................. 707/100 |
| 2006/0156247 A1 | 7/2006 | McCormack et al. |
| 2006/0184896 A1 | 8/2006 | Foucher et al. |
| 2007/0185783 A1* | 8/2007 | Westphal ........................ 705/27 |
| 2008/0009325 A1* | 1/2008 | Zinn et al. ..................... 455/566 |
| 2008/0276171 A1* | 11/2008 | Sabo ............................. 715/711 |
| 2010/0042951 A1* | 2/2010 | Ogren ........................... 715/841 |

* cited by examiner

METHOD FOR PROVIDING OPTIONS ASSOCIATED WITH COMPUTER APPLICATIONS IN A MOBILE DEVICE AND A MENU AND APPLICATION THEREFOR

TECHNICAL FIELD

The following relates generally to providing options associated with computer applications in a mobile device, and has particular utility in moving and organizing computer applications.

DESCRIPTION OF THE PRIOR ART

Computer applications are typically accessible to a user via an operating system of a computing device. The applications are either stored directly on the device or loaded via a portal, e.g. a web browser etc. Most often, the applications are loaded by selecting an icon presented on a display using an selection tool such as a mouse or toggle button. The icons and applications themselves can be organized into folders and the organization can be visualized on one or more screens.

The organization of the applications (and associated icons) can involve moving, grouping, deleting, adding etc. Typically these options are provided in a menu that is displayed in response to a user command. The user can scroll through the menu and if applicable, load a sub-menu to access further features associated with a general feature.

The presentation of menus and sub-menus often requires loading new screens and when sub-menus are accessed, further screens are typically loaded. If the user is forced to navigate through these menus they may become confused or forget what they originally intended to do. When an unfamiliar or seemingly unrelated menu appears, the user may choose to exit the menu entirely because they feel they have done something incorrect. For mobile devices, where the displays are relatively small and the interface mechanisms more limited, these disadvantages can be exacerbated.

It is therefore an object of the following to obviate or mitigate at least one of the above disadvantages.

BRIEF DESCRIPTION OF THE DRAWINGS

Embodiments will now be described by way of example only with reference to the appended drawings wherein.

DETAILED DESCRIPTION OF THE DRAWINGS

Figure 1:
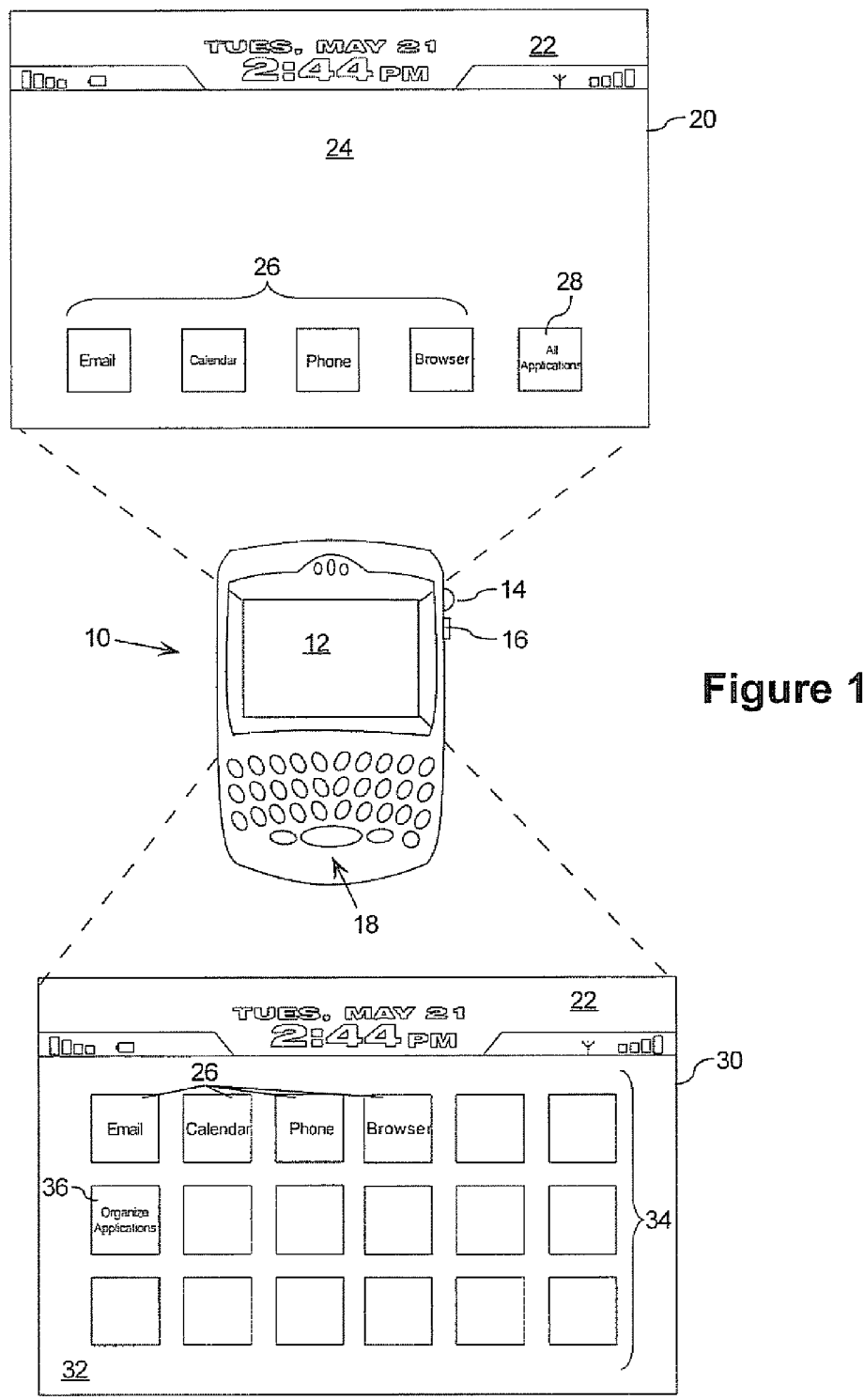
FIG. 1 is a schematic diagram of a mobile device and a pair of display screens therefor.

Referring first to FIG. 1, a mobile device 10 is shown. The mobile device 10 generally comprises a display 12 and a cursor of view positioning device 14, such as a positioning wheel (as shown) or a trackball (not shown). A wide range of one or more positioning or cursor/view positioning mechanisms such as a touch pad, a joystick button, a mouse, a touchscreen, a tablet or other whether presently known or unknown may be employed. The mobile device 10 also comprises an escape or cancel button 16 and a keyboard 18. In this example, the keyboard 18 is disposed on the front face of the mobile device housing and positioning device 14 and cancel button 16 are disposed at the side of the housing. The keyboard 18 is in this example a standard QWERTY keyboard but instead a reduced QWERTY keyboard may instead be employed.

Positioning device 14 may serve as another input member and is both rotatable to provide selection inputs to the processor 238 (see FIG. 10) and can also be pressed in a direction generally toward housing to provide another selection input to the processor 238. The display 12 may include a cursor (not shown) that depicts generally where the next input or selection will be received.

It will be appreciated that the mobile device 10 shown in FIG. 1 is for illustrative purposes only and various other mobile devices are equally applicable to the following examples.

Figure 10:
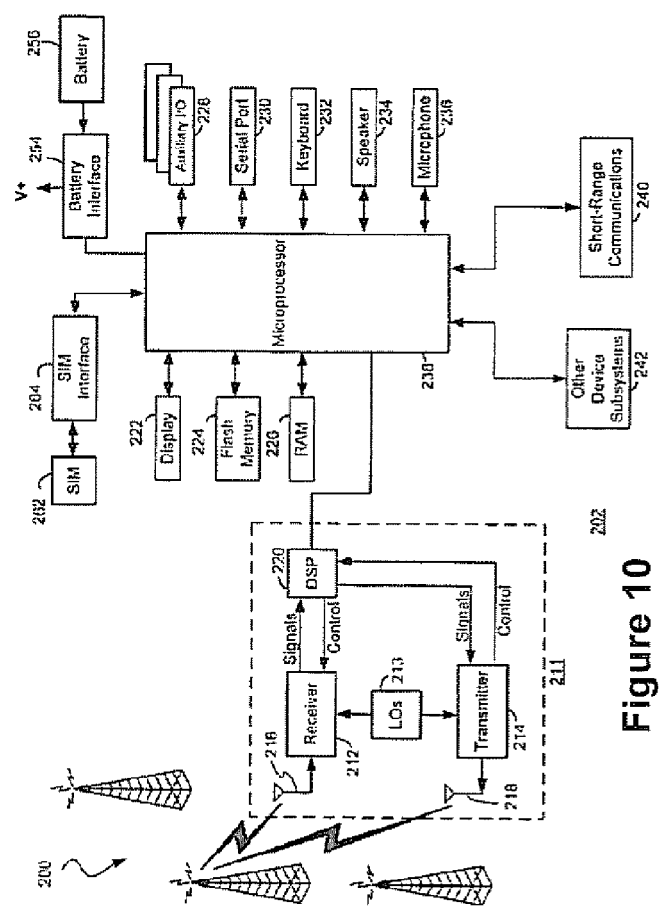
FIG. 10 is a schematic block diagram of components of the mobile device of FIG. 1.

FIG. 10 is a detailed block diagram of a preferred mobile station 202 of the present disclosure. The term "mobile station" will herein refer to the operable components of, e.g. mobile device 10. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities)—e.g. mobile device 10 shown in FIG. 1. Mobile station 202 may communicate with any one of a plurality of fixed transceiver stations 200 within its geographic coverage area.

Mobile station 202 will normally incorporate a communication subsystem 211 which includes a receiver 212, a transmitter 214, and associated components such as one or more (preferably embedded or internal) antenna elements 216 and 218, local oscillators (LOs) 213, and a processing module such as a digital signal processor (DSP) 220. As will be apparent to those skilled in field of communications, particular design of communication subsystem 211 depends on the communication network in which mobile station 202 is intended to operate.

Mobile station 202 may send and receive communication signals over a network after required network registration or activation procedures have been completed. Signals received by antenna 216 through the network are input to receiver 212, which may perform such common receiver functions as signal amplification, frequency down conversion, filtering, channel selection, and like, and in example shown in FIG. 10, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 is one type of a conventional "smart card" used to identify an end user (or subscriber) of the mobile station 202 and to personalize the device, among other things. Without SIM 262, the mobile station terminal is not fully operational for communication through a wireless network. By inserting SIM 262 into mobile station 202, an end user can have access to any and all of his/her subscribed services. SIM 262 generally includes a processor and memory for storing information. Since SIM 262 is coupled to a SIM interface 264, it is coupled to microprocessor 238 through communication lines. In order to identify the subscriber, SIM 262 contains some user parameters such as an International Mobile Subscriber Identity (IMSI). An advantage of using SIM 262 is that end users are not necessarily bound by any single physical mobile station. SIM 262 may store additional user information for the mobile station as well, including datebook (or calendar) information and recent call information.

Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides a regulated voltage V to all of the circuitry.

Mobile station 202 includes a microprocessor 238 which controls overall operation of mobile station 202. Communication functions, including at least data and voice communications are performed through communication subsystem 211. Microprocessor 238 also interacts with additional device subsystems such as a display 222, a flash memory 224, a random access memory (RAM) 226, auxiliary input/output subsystems 228, a serial port 230, a keyboard 232, a speaker 234, a microphone 236, a short-range communications subsystem 240, and any other device subsystems generally designated at 242. Some of the subsystems shown in FIG. 10 perform communication-related functions, whereas other subsystems may provide "resident" or on-device functions. Notably, some subsystems such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, as well as the inventive functionality of the present disclosure, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In the present disclosure, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 10 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure 15 device communication.

Short-range communications subsystem 240 of FIG. 10 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Turning back to FIG. 1, the mobile device 10 displays a home screen 20, which is preferably the active screen when the device 10 is powered up and constitutes the main ribbon application for displaying the icons 26, 28. The home screen 20 generally comprises a status region 22 and a theme background 24, which provides a graphical background for the display 12. The home screen 20, in addition to the graphical theme background 24 includes a series of icons 26 that relate to user-defined "favourite" applications. The home screen 20 preferably limits the number icons 26 shown on the home screen 20 so as to not detract from the background 24, which is typically chosen for aesthetic reasons. The home screen 20 also comprises a selectable indicator 28 (e.g. another icon) that takes the user to a main application screen 30, shown in the lower portion of FIG. 1

An application, such as the email application 432, may then be initiated (opened or viewed) from display 12 by providing a suitable user input to it. For example, email application 432 may be initiated by rotating positioning device 14 to highlight the email icon 26 and providing a selection input by translating the positioning device 14.

Movement, navigation, and/or scrolling with use of a cursor/view positioning mechanism is beneficial given the relatively large size of visually displayed information and the compact size of display 127, and since information and messages are typically only partially presented in the limited view of display 12 at any given moment. As previously described, positioning device 14 is one helpful cursor/view positioning mechanism to achieve such movement. Positioning device 14, which may be referred to as a scrollwheel or scroll device, specifically includes a circular disc which is rotatable about a fixed axis of housing and may be rotated by the end user's index finger or thumb. When the information or message is being partially displayed an upwards rotation of positioning device 14 causes an upwards scrolling such that display 12 presents viewing of an upper portion of the information or message. Similarly, a downwards rotation of positioning device 14 causes a downwards scrolling such that display 12 presents viewing of a lower portion of the information or message. Positioning device 14 is mounted along a fixed linear axis such that the end user can depress positioning device 14 inwards toward housing for selection of information.

Figure 2:
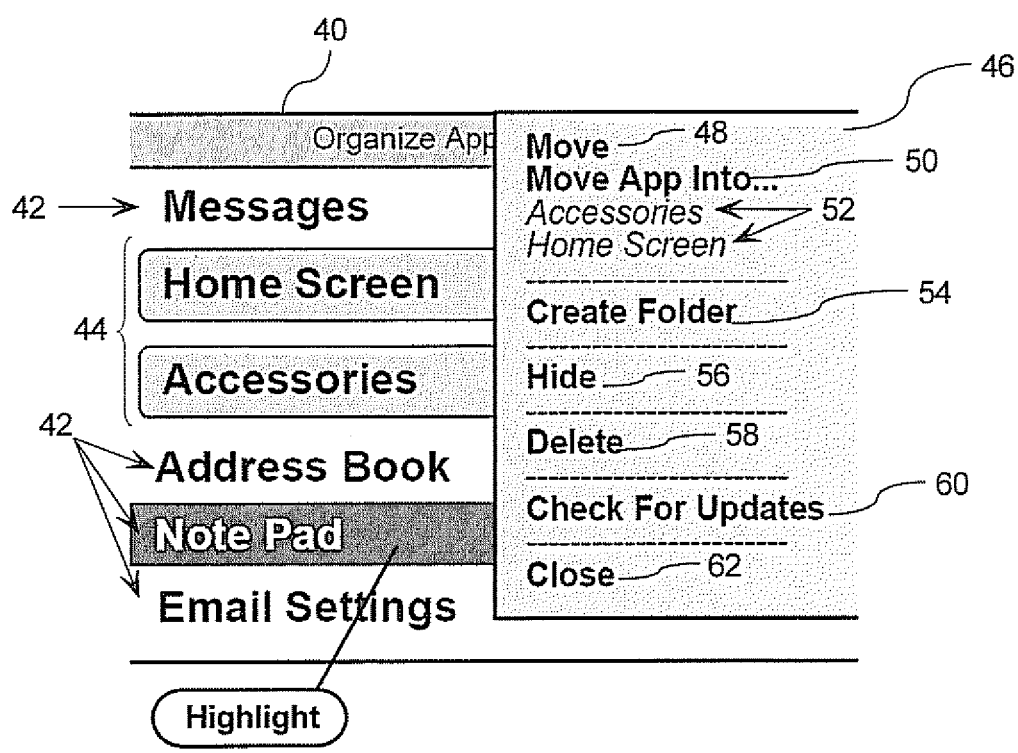
FIG. 2 is a screen shot of a organize applications tool.

The application screen 30 comprises a similar status region 22, and an application portion 32 that displays a series of icons 34 for enabling user input to cause the processor 238 to access respective "visible" applications provided by the mobile device 10. A "visible" application is generally one that has not been hidden from view on the display 12 as will be explained in greater detail below. The series of icons 34 preferably displays the home screen icons 26 (first four icons in this example) as well as an "organize applications" icon 36 that enables the user to initiate access of an organization application 40 by the processor 238. A screen shot of the output displayed when the organization application 40 is initiated by the processor 238 is shown in FIG. 2. One or more of the series of icons 34 is typically a folder (not shown) that itself is capable of organizing any number of applications therewithin.

Figure 11:
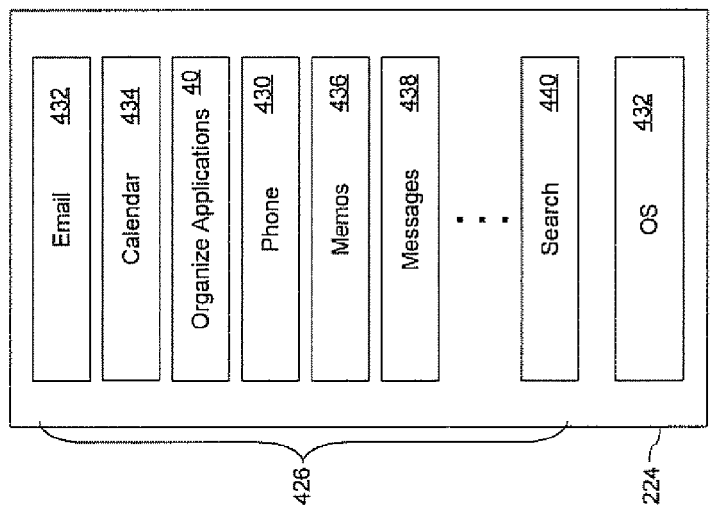
FIG. 11 is a schematic block diagram of the memory shown in FIG. 10.

As shown in FIG. 11, memory 224 includes a plurality of applications 426 associated with the series of icons 34 for the processing of data. Applications 426 may be any variety of forms such as, without limitation, software, firmware, and the like. Applications 426 may include, for example, a phone application 430, the organization application 40, electronic mail (e-mail) 432, calendar program 434, memo program 436, messages 438, search 440 etc. An operating system (OS) 432 also resides in memory 224. The mobile device 10 of the present disclosure is also adapted to enable communication between different ones of the applications, e.g. between organization application 40 and the others of the applications 426 such that applications on the device 10 can be modified, moved, sorted and otherwise interacted with for the purposes of organizing and/or manipulating the visibility of the icons for those applications 426.

Turning back to FIG. 2, the organization application 40 displays a list of application indicators 42 associated with each application icon 34 (and corresponding application stored in memory 224) that is not a folder, and a list of folder indicators 44 associated with each folder. As shown in FIG. 2, highlighting one of the folder indicators 44 or application indicators 42 using an appropriate input mechanism causes the processor 238 to load a menu 46 from the application 40 stored in memory. In this example, the indicators 42, 44 are textual labels arranged in a list. It will be appreciated that other types of indicators could be used such icons etc. Preferably, the menu 46 is displayed upon pressing the positioning device 14, wherein toggling the positioning device 14 enables the user to highlight a specific option in the menu 46.

The menu 46 may list any number of desired options. Shown in FIG. 2 are a "move" option 48, which upon selection by the user, enables the user to move the position of the highlighted indicator (e.g. note pad 42); and a "move into" option 50, which includes a sub-list of outcomes 52. In this example, the list of outcomes is indicative of the folders into which the application indicator 42 (and consequently access to the application) can be moved. The sub-list of outcomes 52 may be italicized or comprise different colours to indicates ones that have been added etc. A folder is an organizational element for memory 224 that can group the applications 426 into user-defined (or default) sets. The folder enables the user to visually categorize the applications 426 and a folder is typically displayed such that it is distinguishable from an application 426. The sub-list of outcomes 52 is created by the processor 238 searching the memory 224 to determine available folders. Preferably, the user scrolls from the move option 48 directly into the sub-list of outcomes 52, and from there can continue scrolling past the sub-list 52 to the remaining options if so desired.

The sub-list of outcomes 52 eliminates the need to have the processor 238 load a sub-menu in order to display to the user a set of choices of possible outcomes, outcomes in this example being those folder in which the application 426 can be moved. Prior menus traditionally either display a sub-menu laterally from the main menu or load a new screen with a list of the outcomes. Where the display space is at a premium (e.g. in mobile device 10), the lateral sub menu is undesirable as it may confuse the user as it would likely conceal the indicators 42, 44. Similarly, loading a new menu may also confuse the user as they may believe that they have selected an incorrect option and would have to become accustomed to the way in which to navigate between the menus. The menu 46 shown in FIG. 2 overcomes the confusion by placing the sub-list of outcomes 52 logically beneath the option 50 such that a sub-menu is not required.

The menu 46 in this example also includes a "create folder" option 54, which enables the user to have the processor 238 create a folder (and store the folder in memory 224), to further organize their icons 34' and a "hide" option 56. The hide option 56 enables the user to have the processor 238 visually conceal the icon for that application 426 in the screens 20 and 30 (and similarly any other display screen other than screen 40) while locking access to that application 426.

It will be appreciated that in the following description, like elements with respect to FIG. 2 are given like numerals where the element is the same and similar elements are given like numerals with a prefix 1, 2, 3 etc.

Figure 3:
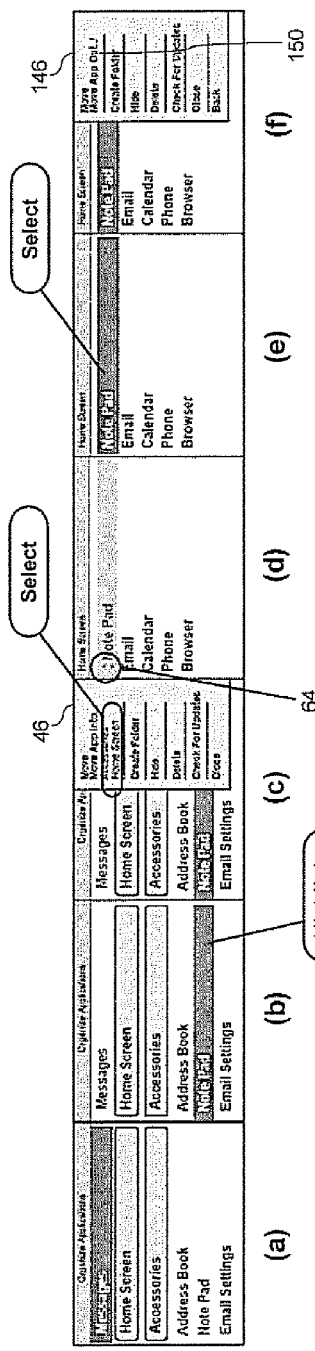
FIG. 3 is a series of screen shots illustrating moving an application into a folder using the tool of FIG. 2.

Turning now to FIG. 3, a first example using the organization application 40 is shown, wherein the note pad application is moved into the home screen 20. Screen (a) represents the organization application 40 when it is first accessed upon selection of the icon 36. In this example, the user moves the note pad application into the home screen 20 and thus first scrolls and highlights the note pad indicator 42 as shown in screen (b). The menu 46 is displayed upon selecting the desired indicator 42 (which is also highlighted), e.g. by actuating the positioning device 14' pressing the enter key on the keyboard 18 or using any other desired input stimulus.

The menu 46 is shown in screen (c) and it can be seen in this figure (similar to FIG. 2), that the sub-list of outcomes 52 for the "move into" option 50 are listed directly in the menu 46, and in this example are a "move into the accessories folder" outcome 52 and a "move into the home screen" outcome 52. This indicates that there is one folder (other than the conceptual home screen folder), namely an accessories folder (not shown) that resides in the application screen 30. As discussed above, moving an application into the home screen 20 makes the icon 34 for that application currently available directly from the home screen 20. In this example, a maximum of five applications are allowed in the home screen 20, and thus moving the note pad application into the home screen 20 is acceptable.

The user can select the home screen 20 from the sub-list of outcomes 52 by scrolling to the desired folder thereby highlighting the indicator for that folder, and selecting the desired folder. Screen (d) is then displayed, which shows a list of the applications that currently reside in the home screen 20, including the newly moved note pad application. Preferably, the note pad indicator is in moving mode immediately after it is organized into its new folder, as shown in screen (d), which highlights the indicator and appends a moving mode feature 64. The moving mode feature 64 instructs the processor 238 to maintain partial selection (similar to a drag and drop feature) until the user provides an input indicating to the processor 238 that the indicator 42, 44 is in the desired placement on the display 12 and thus the moving operation is completed.

The moving mode feature 64 enables the user to move the indicator within the folder 2 by actuation of the positioning device 14, which places the indicator in the desired location and e.g. pressing the positioning device 14 or any other suitable input stimulus to arrive at what is shown in screen (e). Screen (f) shows a menu 146 that is displayed upon selecting an application within a folder that does not have another folder within itself. As can be seen from screen (f), the move into option 50 is replaced in the menu 146 by the processor 238 with a "move out" option 150, which enables the user to move any of the applications in the home screen 20 out of the folder and into the application screen 30.

The moving mode feature 64 eliminates the user having to select further options to move the indicator and thus upon moving an application, the program preferably defaults into the moving mode at which time the user can organize the order of the indicators 42 if so desired.

The methods described above (and below) may be embodied in a computer program product comprising a computer readable medium and computer instructions stored in the computer readable medium which are executable by one or more processors, e.g., the processor 238 of the mobile station 202. In particular, the methods may be executable on the mobile device 10 which has a wireless transmitter 214 and receiver 212; one or more processors coupled to the wireless transmitter 214 and receiver 212; and a user interface such as that described above; wherein the one or more processors are operative to execute the method.

Figure 4:
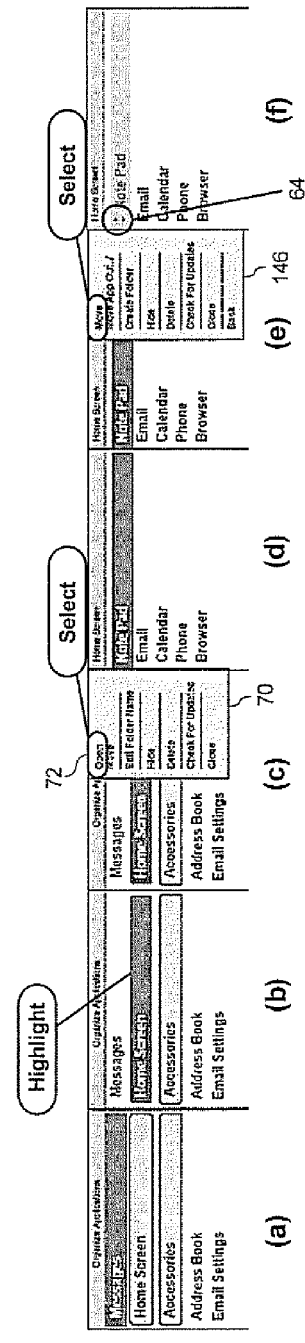
FIG. 4 is a series of screen shots illustrating moving an application within a folder using the tool of FIG. 2.
Figure 4:
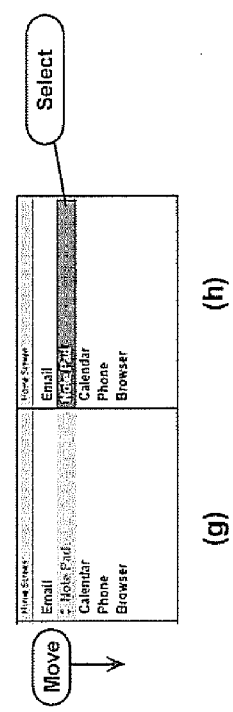

A second example using the organization application 40 is shown in FIG. 4, wherein the note pad is moved within the home screen folder. Screen (a) is similar to that shown 21 in FIG. 3. In this example, the user highlights and selects the folder indicator 44 for the home screen folder as shown in screens (b) and (c). Since the selected indicator is for a folder, a different menu 70 than that shown in FIG. 3 is displayed, which provides a modified list of options. In this example, the menu 70 provides, in part, an "open" option 72.

Selecting the open option then displays the applications that are currently organized in the home screen 20 as shown in screen (d). To move the note pad within the home screen folder, the note pad indicator 42 is selected, which displays the menu 146. The user then scrolls to and selects the move option 48 as shown in screen (e). Selection of the move option 48 initiates the moving mode feature 64, which enables the user to highlight a desired location as shown in screen (g), wherein upon actuation of the positioning device 14, the processor 238 places the indicator 42 in the desired location as shown in screen (h).

It can therefore be seen from this second example, that the move option 48 can enable the user to initiate the moving mode feature 64, and thus the moving mode feature 64 can be user activated and need not only be a default option upon moving an application into a folder. In this way, the user can shuffle and rearrange the order of the applications at any time, according to the steps shown in FIG. 4.

Figure 5:
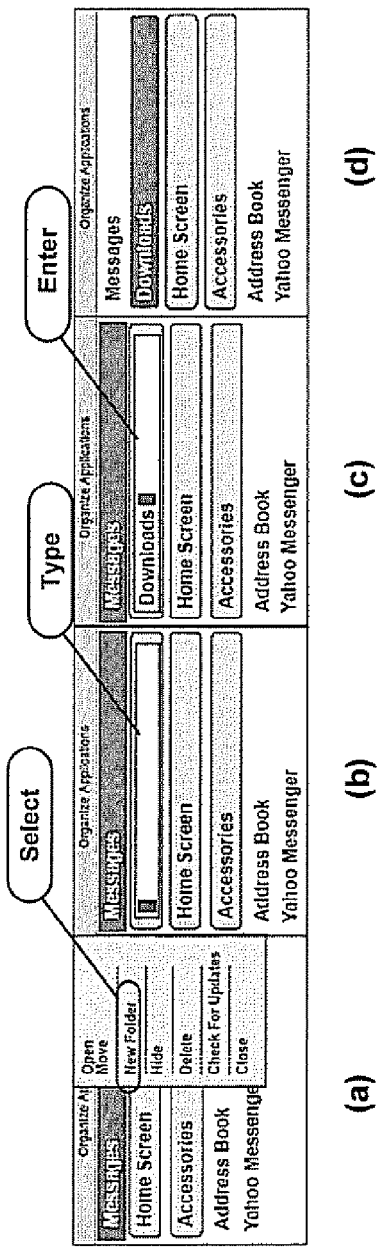
FIG. 5 is a series of screen shots illustrating creating a new folder using the tool of FIG. 2.

A third example using the organization application 40 is shown in FIG. 5, wherein a new folder is added. In this example, the user selects any one of the indicators in screen (a) to display the menu 46. The create folder option 54 is then selected, which adds an empty folder 44 as shown in screen (b), with an embedded entry box by default to cue the user to type in a folder name. In this example, a "Downloads" folder 44 is created and thus the user enters the string "D-O-W-N-L-O-A-D-S" as shown in screen (c) via the keyboard, and selects, enters or otherwise finalizes the entry to instruct the processor to create the folder 44 both for display as shown in screen (d) and in memory 224. By creating the downloads folder 44, the user can then further organize the applications by moving applications into this folder as will be explained below making reference to FIG. 6.

Figure 6:
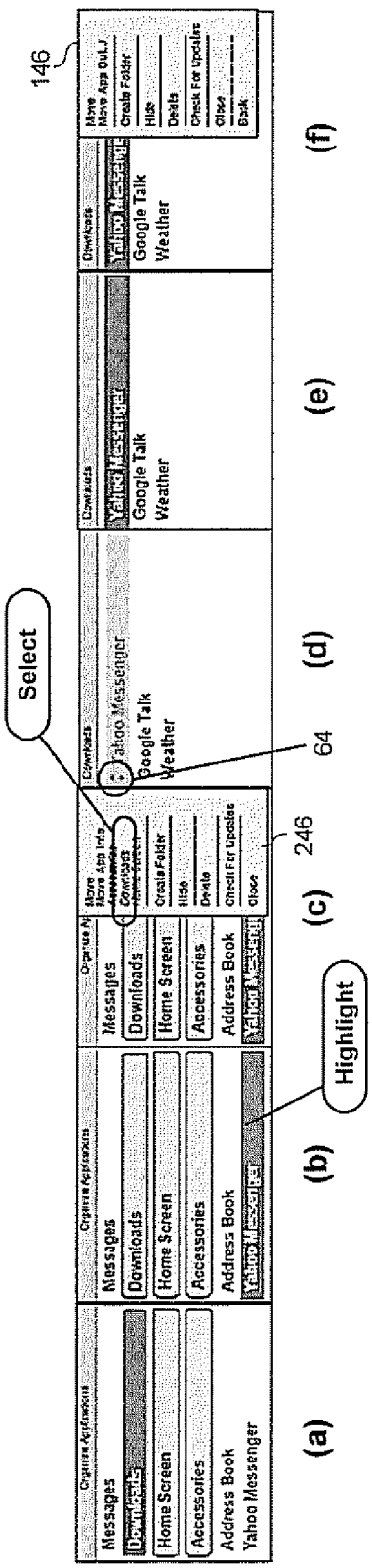
FIG. 6 is a series of screen shots illustrating moving an application into the new folder created in FIG. 5.

A fourth example using the organization application 40 is shown in FIG. 6, wherein the Yahoo Messenger™ application 42 is moved into the newly created downloads folder 44. As shown in screens (a) and (b), the user first enters the organization application, scrolls to the desired indicator (in this example for the Yahoo Messenger™ application 42), selects the indicator, which displays the menu 246 as shown in FIG. 6. It should be noted that menu 246 differs from menu 46 in that the sub-list of outcomes 52 now includes the downloads folder under the move into option 50 as shown in screen (c).

The user may then scroll to and select the downloads folder 44, which takes the user directly to the downloads folder as shown in screen (d). The downloads folder 44 comprises a Google Talk™ application and a Weather application which were previously added to the downloads folder in a manner similar to that shown in FIG. 6 (not shown in the figures). As can also be seen from screen (d), the moving mode feature 64 is automatically initiated and in this example, the user selects the default position at the top of the folder 44 as shown in screen (e). Screen (f) illustrates that the user can choose to move the Yahoo Messenger™ application out of the downloads folder 44 by selecting its indicator as described above.

Figure 7:
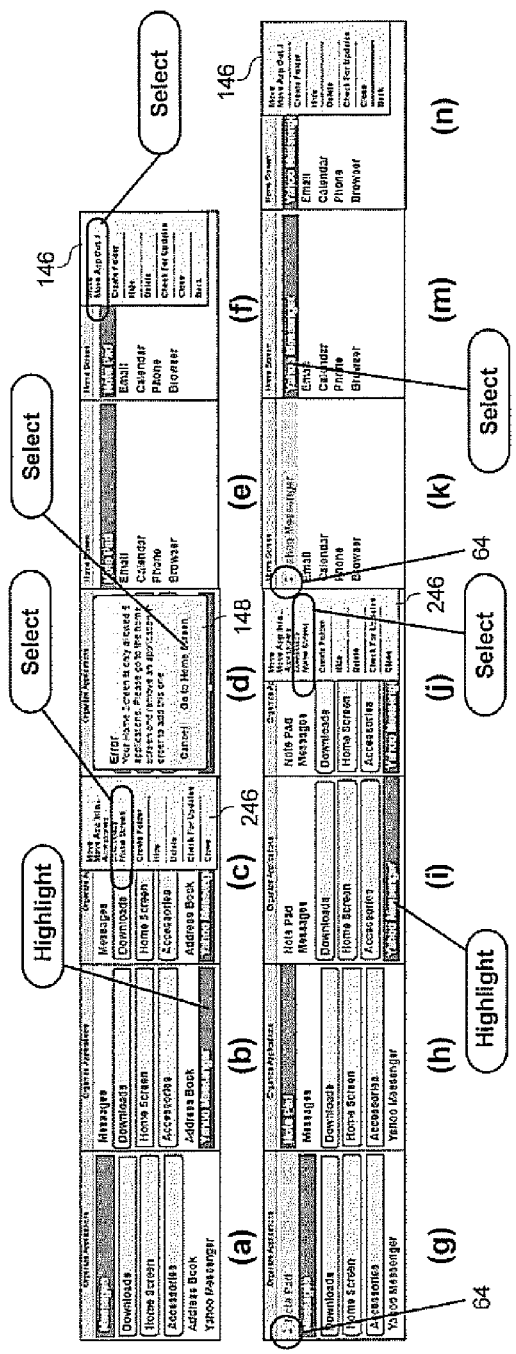
FIG. 7 is a series of screen shots illustrating replacing an application in a home screen with another application using the tool of FIG. 2.

A fifth example using the organization application 40 is shown in FIG. 7 and follows from the example shown in FIG. 5, wherein, in this example an attempt to move the Yahoo Messenger™ application 42 into the home screen 20 is then made. As shown in screen (a), the organization application 40, in this example, lists the download, home screen and accessories folder in addition to those applications that have not been organized into such folders. As shown in screens (b) and (c), the Yahoo Messenger™ application 42 is highlighted and selected to display the menu 246. The user may then select "home screen" from the list of outcomes under the move into option 50.

In this example, since the home screen is set to only display up to five (5) applications, and there are currently five (5) applications on the home screen 20, an error message 148 is displayed notifying the user that in order to make the selected move, at least one application needs to be removed from the home screen folder. Preferably, as shown in screen (d), the error message 148 provides an option to go directly to the home screen folder 44 so that the user can remove an application as shown in screen (e). The user may then select a desired indicator 42, e.g. that for the note pad application, and select the move out option 150 as shown in screen (f) which then places the note pad application back into the organization screen 40 as shown in screen (g).

Preferably, by default, the moving mode feature 64 is initiated in the event that the user wishes to move the note pad indicator within the screen 40. The may instead select the current location as shown in screen (h) and then scroll and highlight the Yahoo Messenger™ application 42 as shown in screen (i). The user may then select the indicator 42 to instruct the processor 238 to access and display menu 246, and then the user may select the home screen from the list of outcomes as originally intended, as shown in screen (j). Screens (k), (m), and (n) illustrate that the user can then move, place and if desired move the application out of its current folder, similar to what has been described above.

Figure 8:
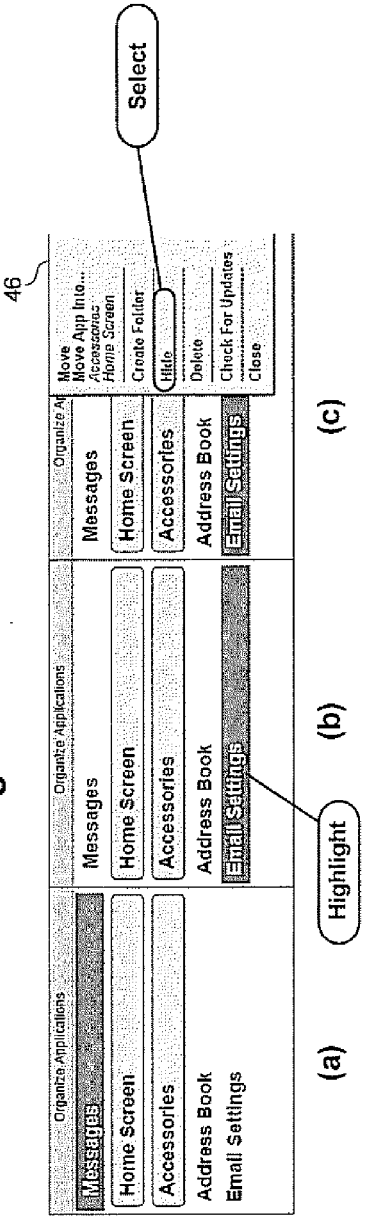
FIG. 8 is a series of screen shots illustrating hiding an application using the tool of FIG. 2.

A sixth example using the organization application 40 is shown in FIG. 8, wherein the email setting application is hidden by the user. As shown in screens (a), (b) and (c), the user can scroll, highlight and select a desired indicator, in this example the indicator associated with the email settings application. In order to hide the email settings application in the organization screen 30, the user scrolls within the menu 46 and selects the hide option 56. Once the application has been hidden, it preferably appears "greyed out" as shown in screen (a) of FIG. 9.

Figure 9:
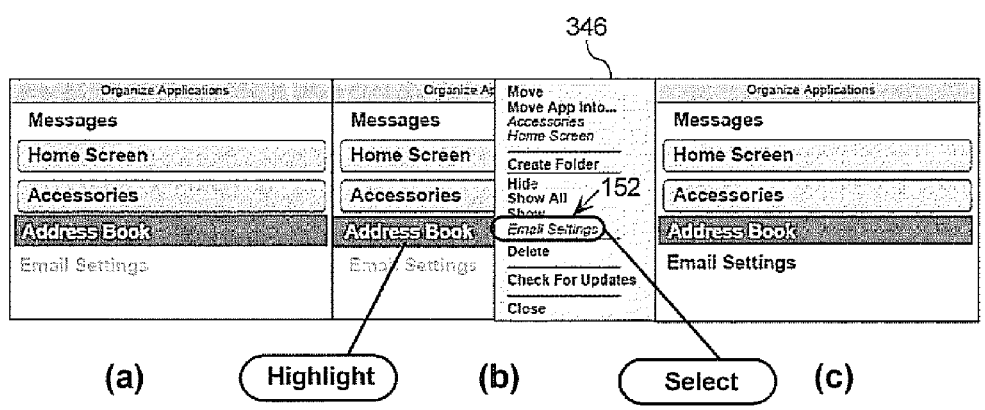
FIG. 9 is a series of screen shots illustrating restoring all hidden applications using the tool of FIG. 2.

A seventh example using the organization application 40 is shown in FIG. 9, wherein the email settings application is unhidden. As shown in screens (a) and (b), since the indicator 42 for the email settings application is greyed out, it preferably cannot be highlighted. However, by selecting any of the indicators 42, 44 the menu 346 is displayed. The menu 346 differs from menu 46 in that since one or more indicators/applications has been hidden, a show option 152 is listed, with its own sub-list of outcomes. The show option 152 preferably comprises a "show all" feature that enables the user to immediately unhide each and every application that has been hidden, as well as a "show" feature under which the sub-list of outcomes is displayed. Similar to the sub-list of outcomes for the move into option 50, the user preferably scrolls directly through the sub-list as they navigate down the menu 346. In this example, the list of outcomes is associated with those applications which the user desires to be unhidden. As such, the user can select a desired application directly from the menu 346, and the program then goes directly back to the folder (or screen) in which the hidden application currently resides as shown in screen (c).

The sub-list provided by the show option 152 avoids the user having to enter a sub-menu in order to select the desired application, but rather enables direct access to the desired outcome. The user can then clearly associate their chosen outcome with its associated option as all this information is conveniently displayed together in the menu 346.

It can therefore be seen that by providing a sub-list of outcomes associated with one or more options in a menu, the user can clearly associate each outcome with the respective option with minimized confusion that can arise from navigating through branched sub-menus and/or additional screens. The sub-list is particularly beneficial for options such as a move into option 50 and show option 152 that typically include a manageable number outcomes for the respective option. Preferably, the sub-lists are shown only when the outcomes are possible and thus the menu 46 should be capable of dynamically adding and removing outcomes and sub-lists, e.g. to create new menus such as menus 146, 246 and 346.

It will be appreciated that the particular options, outcomes, applications, screen shots and icons shown in the figures and described above are for illustrative purposes only and many other variations can be used according to the principles described.

It will also be appreciated that the organization application 40 is typically stored on the mobile device 10 in memory 224 as an executable program accessible by the processor 238 via an instruction caused by the user selecting the icon 36 with an input device (e.g. positioning device 14) and comprises known or custom graphical user interface elements capable of displaying and launching routines for executing the various options and outcomes provided. It will also be appreciated that the principles outlined above may also be applied to desktop applications and need not be limited to mobile devices 10.

Although the invention has been described with reference to certain specific embodiments, various modifications thereof will be apparent to those skilled in the art without departing from the spirit and scope of the invention as outlined in the claims appended hereto.

What is claimed is:

1. A method for enabling application indicators currently displayed on a mobile device to be moved, said method comprising:

identifying an input to said mobile device for initiating a menu containing a list of a plurality of options associated with a highlighted one of said application indicators currently displayed on said mobile device, said plurality of options comprising a move into option to enable said highlighted one of said application indicators currently displayed on said mobile device to be moved into a different folder;

upon identifying said input, determining at least one folder into which said highlighted indicator can be moved;
modifying said menu to include a sub-list of said at least one folder into which said highlighted indicator can be moved directly beneath said move into option, said sub-list being selectable directly from said modified menu without requiring a sub-menu;
displaying said modified menu;
after detecting selection of a desired one of said at least one folder from said sub-list, immediately moving said highlighted indicator into said desired one of said at least one folder;
displaying said highlighted indicator in said desired one of said at least one folder; and
initiating a moving mode feature upon moving said highlighted indicator into said desired one of said at least one folder, said moving mode feature enabling continued movement of said highlighted indicator to a desired location within said desired one of said at least one folder via an input device while said desired one of said at least one folder continues to be displayed.

2. The method according to claim 1 wherein determining said at least one folder comprises searching a memory of said mobile device for available folders.

3. The method according to claim 1 wherein one of said options is a show option and said modifying said menu further comprises determining a second sub-list of applications currently being hidden, wherein said selection of a desired application from said second sub-list reveals said desired application.

4. The method according to claim 3 comprising providing in said second sub-list, a show all option, wherein selection of said show all option reveals all currently hidden applications.

5. The method according to claim 4 wherein one of said options is a move out of option for moving said highlighted indicator out of a current folder.

6. The method according to claim 5 wherein said items currently displayed on said mobile device are displayed within an organization application for organizing computer applications and comprising a main screen displayable upon loading said organization application, said main screen being capable of displaying folders and application indicators associated with said computer applications.

7. The method according to claim 1 wherein said movement of said highlighted indicator is effected using a scrolling device.

8. A computer readable medium comprising computer readable instructions for enabling application indicators currently displayed on a mobile device to be moved, said computer readable medium comprising instructions for:
identifying an input to said mobile device for initiating a menu containing a list of a plurality of options associated with a highlighted one of said application indicators currently displayed on said mobile device, said plurality of options comprising a move into option to enable said highlighted one of said application indicators currently displayed on said mobile device to be moved into a different folder;
upon identifying said input, determining at least one folder into which said highlighted indicator can be moved;
modifying said menu to include a sub-list of said at least one folder into which said highlighted indicator can be moved directly beneath said move into option, said sub-list being selectable directly from said modified menu without requiring a sub-menu;
displaying said modified menu;
after detecting selection of a desired one of said at least one folder from said sub-list, immediately moving said highlighted indicator into said desired one of said at least one folder;
displaying said highlighted indicator in said desired one of said at least one folder; and
initiating a moving mode feature upon moving said highlighted indicator into said desired one of said at least one folder, said moving mode feature enabling continued movement of said highlighted indicator to a desired location within said desired one of said at least one folder via an input device while said desired one of said at least one folder continues to be displayed.

9. The computer readable medium according to claim 8, wherein determining said at least one folder comprises searching a memory of said mobile device for available folders.

10. The computer readable medium according to claim 8, wherein one of said options is a show option, wherein one of said options is a move out of option for moving said highlighted indicator out of a current folder, and said modifying said menu further comprises instructions for determining a second sub-list of applications currently being hidden, wherein said selection of a desired application from said second sub-list reveals said desired application, said computer readable medium further comprising instructions for providing in said second sub-list, a show all option, wherein selection of said show all option reveals all currently hidden applications.

11. The computer readable medium according to claim 8 wherein said items currently displayed on said mobile device are displayed within an organization application for organizing computer applications and comprising a main screen displayable upon loading said organization application, said main screen being capable of displaying folders and application indicators associated with said computer applications.

12. A mobile device comprising a display, a processor, and a memory storing computer readable instructions for causing said mobile device to:
identify an input to said mobile device for initiating a menu containing a list of a plurality of options associated with a highlighted one of said application indicators currently displayed on said mobile device, said plurality of options comprising a move into option to enable said highlighted one of said application indicators currently displayed on said mobile device to be moved into a different folder;
upon identifying said input, determine at least one folder into which said highlighted indicator can be moved;
modify said menu to include a sub-list of said at least one folder into which said highlighted indicator can be moved directly beneath said move into option, said sub-list being selectable directly from said modified menu without requiring a sub-menu;
display said modified menu;
after detecting selection of a desired one of said at least one folder from said sub-list, immediately move said highlighted indicator into said desired one of said at least one folder; display said highlighted indicator in said desired one of said at least one folder; and
initiate a moving mode feature upon moving said highlighted indicator into said desired one of said at least one folder, said moving mode feature enabling continued movement of said highlighted indicator to a desired location within said desired one of said at least one folder via an input device while said desired one of said at least one folder continues to be displayed.

13. The mobile device according to claim 12, wherein determining said at least one folder comprises searching a memory of said mobile device for available folders.

14. The mobile device according to claim 12, wherein one of said options is a show option and said modifying said menu further comprises instructions for determining a second sub-list of applications currently being hidden, wherein said selection of a desired application from said second sub-list reveals said desired application.

15. The mobile device according to claim 14 further comprising instructions for providing in said second sub-list, a show all option, wherein selection of said show all option reveals all currently hidden applications.

16. The mobile device according to claim 15 wherein one of said options is a move out of option for moving said highlighted indicator out of a current folder.

17. The mobile device according to claim 16 wherein said items currently displayed on said mobile device are displayed within an organization application for organizing computer applications and comprising a main screen displayable upon loading said organization application, said main screen being capable of displaying folders and application indicators associated with said computer applications.

18. A method for enabling application indicators currently displayed on a mobile device to be moved, said method comprising:
    identifying an input to said mobile device for initiating a menu containing a list of a plurality of options associated with a highlighted one of said application indicators currently displayed on said mobile device, said plurality of options comprising a move into option to enable said highlighted one of said application indicators currently displayed on said mobile device to be moved into a different folder, a show option, and a move out of option for moving said highlighted indicator out of a current folder;
    upon identifying said input, determining at least one folder into which said highlighted indicator can be moved by searching a memory of said mobile device for available folders;
    modifying said menu to include a sub-list of said at least one folder into which said highlighted indicator can be moved directly beneath said move into option, said sub-list being selectable directly from said modified menu without requiring a sub-menu, and to include a second sub-list of applications currently being hidden, said selection of a desired application from said second sub-list revealing said desired application;
    providing in said second sub-list, a show all option, wherein selection of said show all option reveals all currently hidden applications
    displaying said modified menu;
    after detecting selection of a desired one of said at least one folder from said sub-list, immediately moving said highlighted indicator into said desired one of said at least one folder;
    displaying said highlighted indicator in said desired one of said at least one folder; and
    initiating a moving mode feature upon moving said highlighted indicator into said desired one of said at least one folder, said moving mode feature enabling continued movement of said highlighted indicator to a desired location within said desired one of said at least one folder via an input device while said desired one of said at least one folder continues to be displayed.

19. A method for enabling application indicators currently displayed on a mobile device to be moved, said method comprising:
    identifying an input to said mobile device for initiating a menu containing a list of a plurality of options associated with a highlighted one of said application indicators currently displayed on said mobile device, said plurality of options comprising a move into option to enable said highlighted one of said application indicators currently displayed on said mobile device to be moved into a different folder and a move out of option for moving said highlighted indicator out of a current folder;
    upon identifying said input, determining at least one folder into which said highlighted indicator can be moved by searching a memory of said mobile device for available folders;
    modifying said menu to include a sub-list of said at least one folder into which said highlighted indicator can be moved directly beneath said move into option, said sub-list being selectable directly from said modified menu without requiring a sub-menu;
    displaying said modified menu;
    after detecting selection of a desired one of said at least one folder from said sub-list, immediately moving said highlighted indicator into said desired one of said at least one folder, displaying said highlighted indicator in said desired one of said at least one folder; and initiating a moving mode feature upon moving said highlighted indicator into said desired one of said at least one folder, said moving mode feature enabling continued movement of said highlighted indicator to a desired location within said desired one of said at least one folder via an input device while said desired one of said at least one folder continues to be displayed; and
    after detecting selection of said move out of option, moving said highlighted indicator out of said current folder.

* * * * *